United States Patent [19]

Herpin

[11] 4,228,701
[45] Oct. 21, 1980

[54] SAW TOOTH CUTTING APPARATUS

[76] Inventor: Ivey Herpin, Rte. 5, Ennis, Tex. 75119

[21] Appl. No.: 547

[22] Filed: Jan. 2, 1979

[51] Int. Cl.² .................................................. B23D 65/02
[52] U.S. Cl. ......................................... 76/29; 83/917; 83/267
[58] Field of Search ................. 76/25 R, 29, 30, 42; 83/917, 267, 733

[56] References Cited

U.S. PATENT DOCUMENTS

| | | | |
|---|---|---|---|
| 3,008,356 | 11/1961 | Herpin | 76/29 |
| 3,766,806 | 10/1973 | Benner | 76/42 |

Primary Examiner—Othell M. Simpson
Assistant Examiner—Roscoe V. Parker
Attorney, Agent, or Firm—Peter J. Murphy

[57] ABSTRACT

A carrier takes up a gin saw blade blank from a magazine stack, swings the blank to position over a collet chuck on a continuously rotating vertical spindle, and places the blade on the chuck. The chuck is actuated to clamp the blade thereto and the chuck is shifted laterally to move the blade into cutting engagement with a cutter wheel having peripherally spaced teeth. The chuck drive includes a yieldable mechanism to permit intermittent stopping of the blade as the cutter teeth pass through. After the cutting cycle, the chuck is again moved laterally to the load-unload position; and an ejector removes the blade from the chuck, after release by the chuck, and carries it to a storage spindle for finished blades. During the cutting cycle, the carrier is moved back to its position over the magazine to pick up a succeeding blank for deposit on the chuck. Apparatus functions are performed by air cylinder motors controlled by a bank of air valves operated by cams on a common cam shaft. A common drive mechanism synchronizes the continuous rotational speed of the collet chuck spindle, the cutter wheel, and the valve operator cam shaft. The operation is fully automatic from pick up of a blade blank from the magazine, to the discharge of the finished blade onto a storage spindle.

14 Claims, 22 Drawing Figures

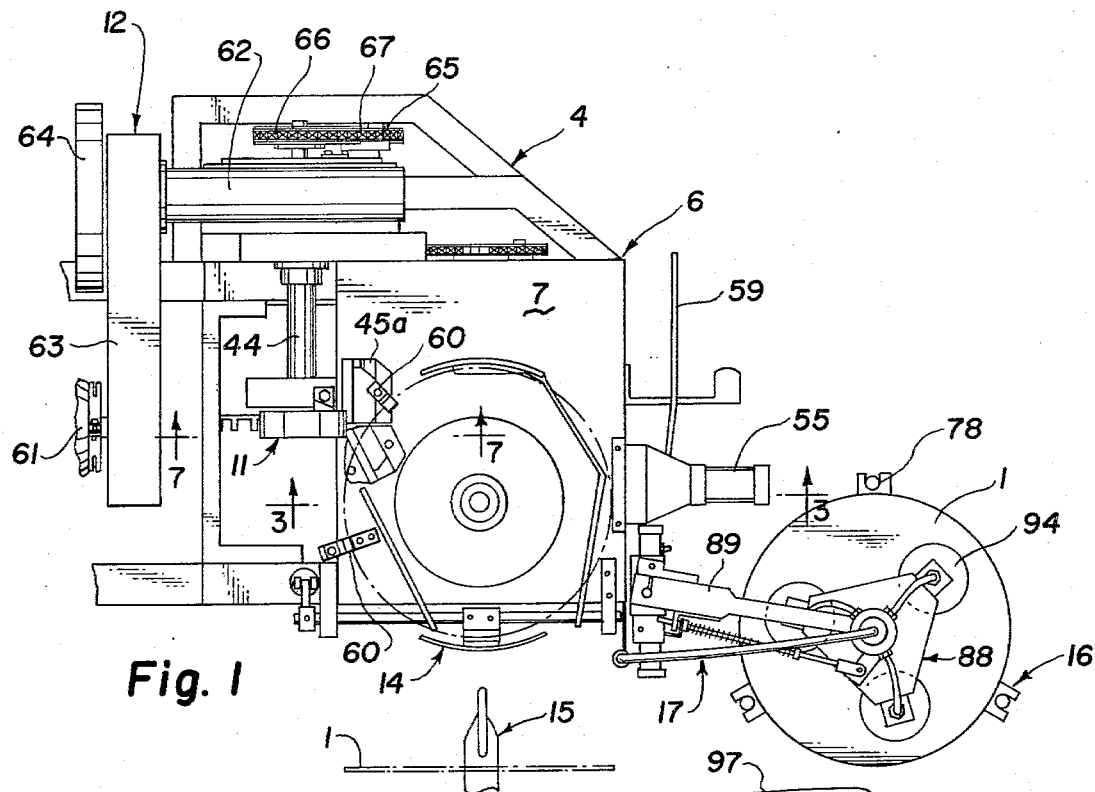
Fig. 1
Fig. 1a
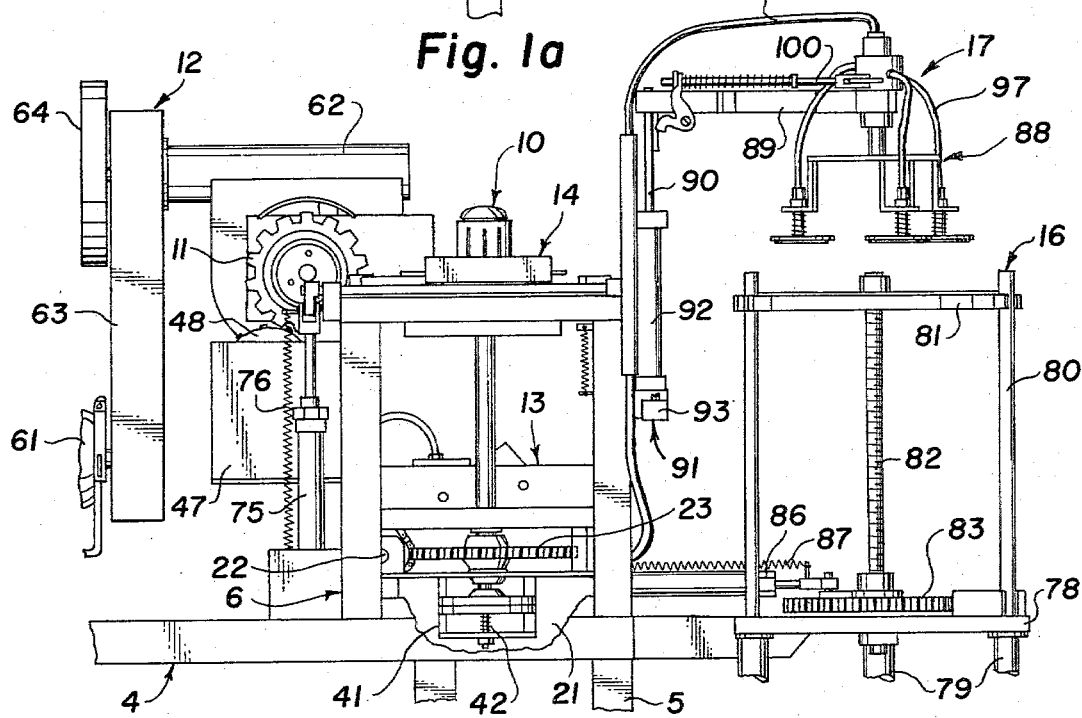
Fig. 2

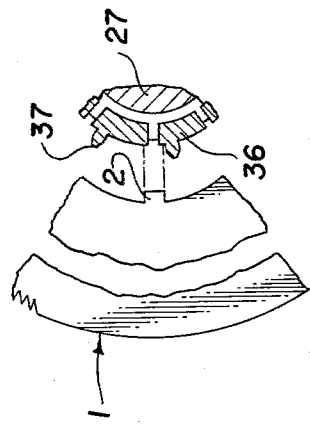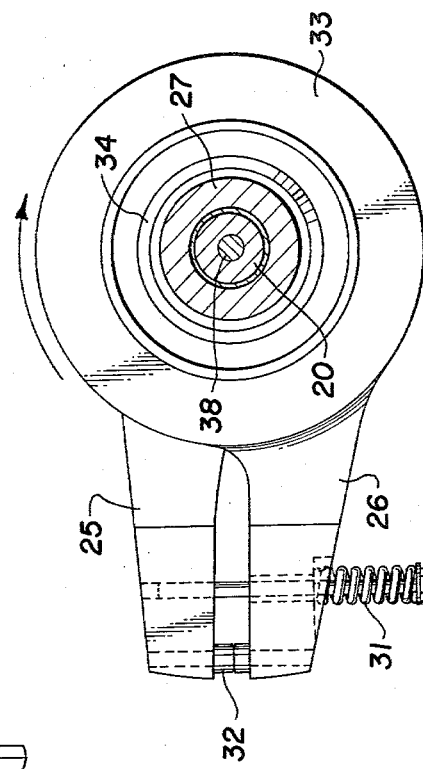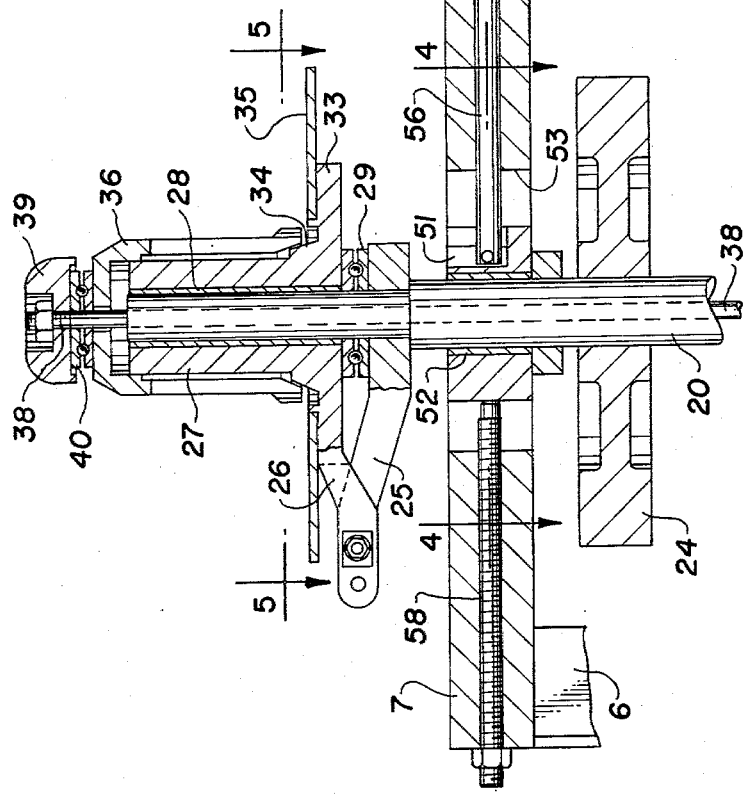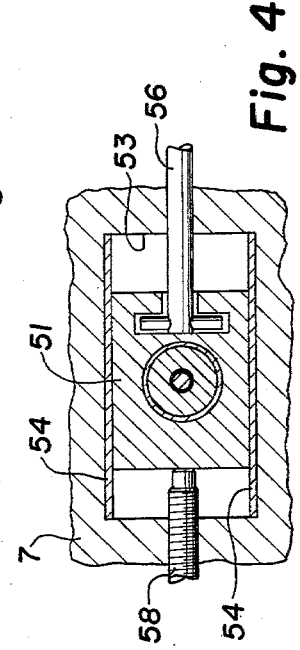

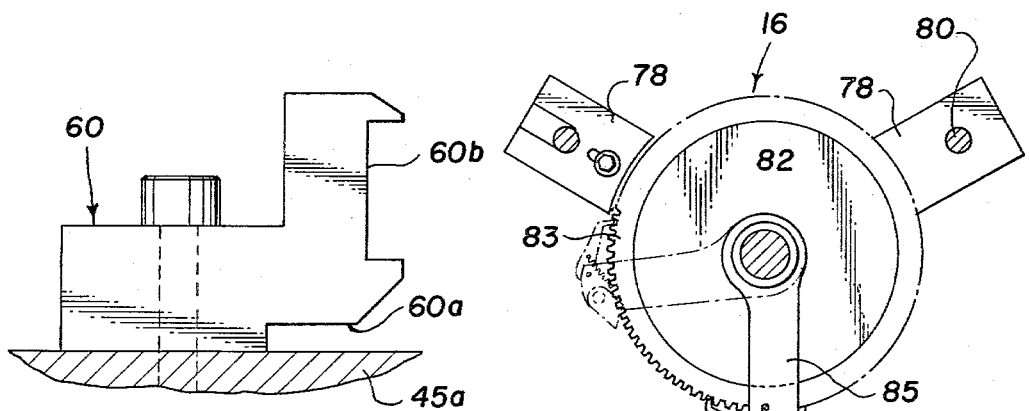
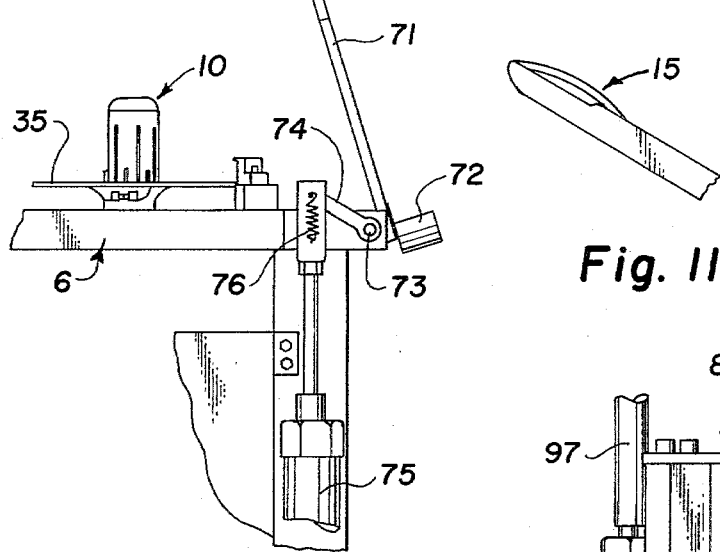
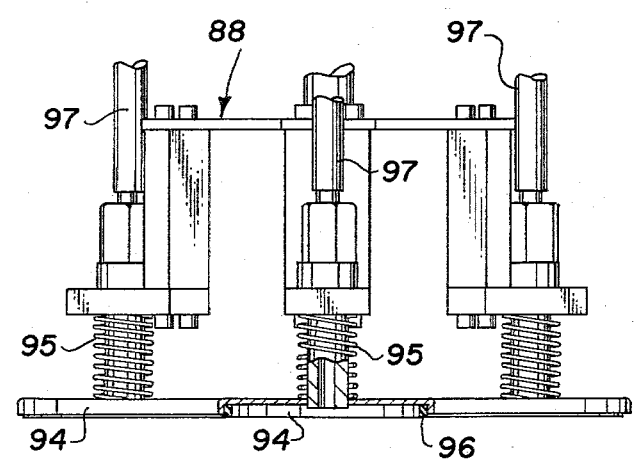
Fig. 10  Fig. 12  Fig. 11  Fig. 11a  Fig. 13

SAW TOOTH CUTTING APPARATUS

BACKGROUND AND SUMMARY OF THE INVENTION

This invention relates to apparatus for cutting teeth in circular saw blades; and more particularly to a completely automatic apparatus for the fabrication of circular saw blades. The apparatus of this invention is an improvement of the apparatus described in a prior patent of the patentee, U.S. Pat. No. 3,008,356, issued Nov. 14, 1961.

A principal object of this invention is to provide apparatus for the fabrication of gin saw blades, or similar blades, where the operation is completely automatic.

Another object of this invention is to provide such apparatus which performs automatically all of the required steps, beginning with the removal of a blade blank from a magazine stack, and ending with the placing of the finished blade on a storage spindle.

A further object of this invention is to provide such apparatus which cuts the teeth of a gin saw blade with precision and with efficient speed.

Another object of this invention is to provide such apparatus having means for preventing damage to the apparatus, or to the saw blade blank, in the event of a mispositioning of the blank relative to the tooth cutting station.

These objects are accomplished in apparatus which comprises a frame and a vertical drive spindle rotatably mounted on said frame. A collet chuck is mounted at the upper end of the spindle for supporting and clamping a saw blade in a horizontal plane. A rotary cutter, having peripherally spaced, radially projecting teeth, is mounted for rotation on an axis tangential to a supported saw blade. The cutter coacts with dies disposed in the plane of the blade surface to cut the blade teeth. Means is provided for feeding the chuck transversely of its axis of rotation, into and out of cutting relation with the rotary cutter. A pneumatic actuator actuates the chuck to clamp and release a blade; and another pneumatic actuator feeds the collet chuck into and out of cutting relation with the rotary cutter. A plurality of cam operated pneumatic valves control the pneumatic actuators; and a plurality of cams are nonrotatably mounted on a cam shaft for controlling the pneumatic valves. Drive means is provided for driving the spindle, the rotary cutter, and the cam shaft at selected speeds relative to each other.

The novel features and the advantages of the invention as well as additional objects thereof, will be understood more fully from the following description when read in connection with the accompanying drawings.

DRAWINGS

FIGS. 1 and 1a are a plan view of apparatus according to the invention;

FIG. 2 is an elevation view of the apparatus of FIG. 1;

FIG. 3 is a fragmentary sectional view taken along the line 3—3 of FIG. 1;

FIG. 4 is a fragmentary sectional view taken along the line 4—4 of FIG. 3;

FIG. 5 is a fragmentary view of the yieldable drive coupling as viewed along the line 5—5 of FIG. 3 (with parts of the collet chuck assembly removed);

FIG. 6 is a fragmentary detail view illustrating the relationship of the gin saw blade to the collet chuck;

FIG. 10 is a detail elevation view of a blade guide;

FIGS. 11 and 11a are elevation views showing the relationship of the blade ejector yoke and storage spindle;

FIG. 12 is a fragmentary plan view of the blank magazine mechanism;

FIG. 13 is a fragmentary view, partially broken away, of the blade carrier head;

DESCRIPTION OF THE PREFERRED EMBODIMENT

Figure 7:
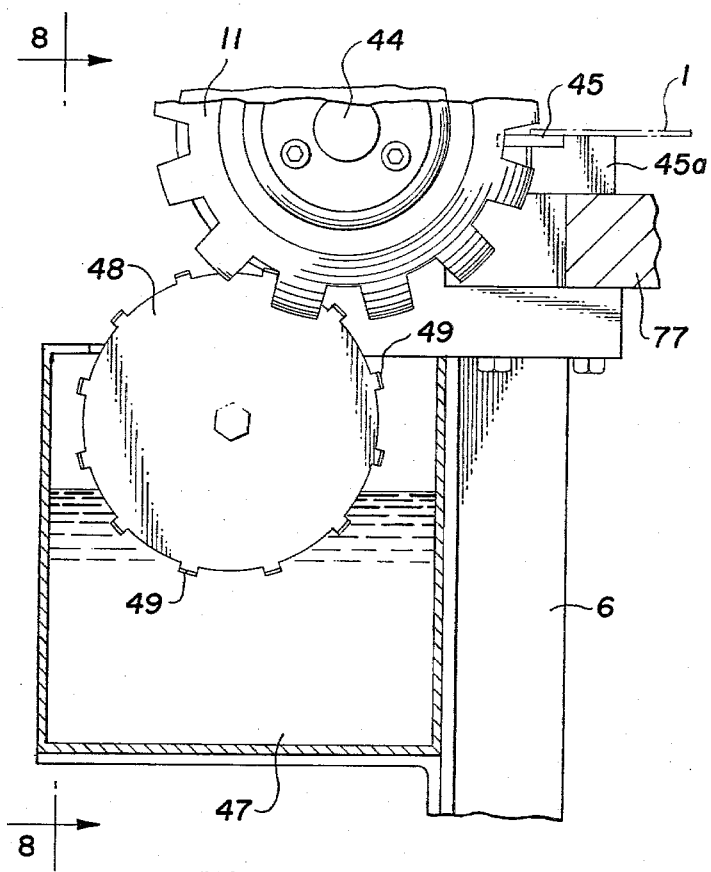
FIG. 7 is a fragmentary elevation view of the tooth cutter mechanism taken along the line 7—7 of FIG. 1.
Figure 8:
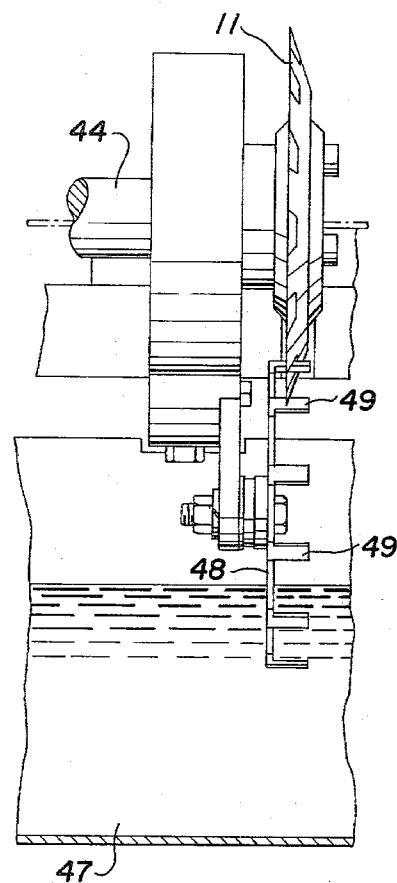
FIG. 8 is a fragmentary elevation view of the tooth cutter mechanism taken along the line 8—8 of FIG. 7.
Figure 9:
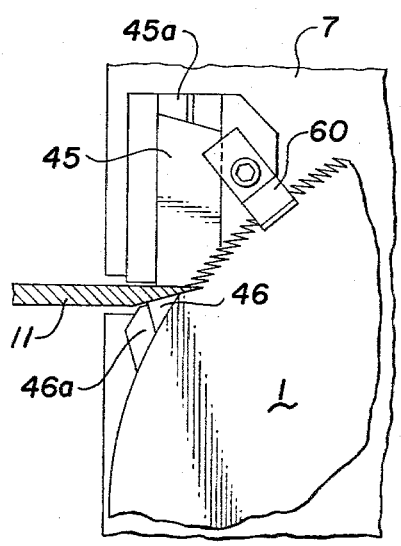
FIG. 9 is a fragmentary plan view showing the relationship of the gin saw blade to the cutter wheel and dies.
Figure 14:
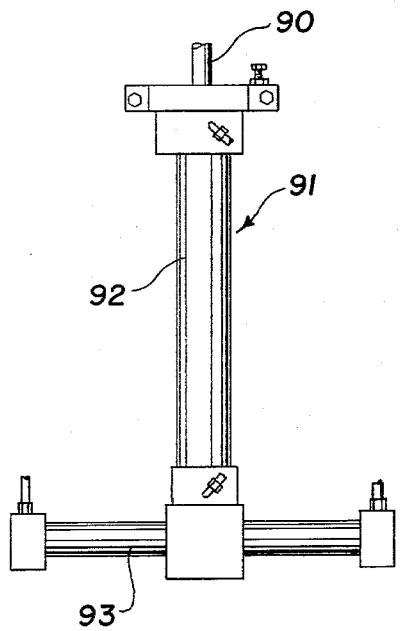
FIG. 14 is a detail view of the air motors for the blank carrier.

The apparatus of the invention is particularly directed to the fabrication of gin saw blades. A partially formed gin saw blade or blade blank 1 is illustrated in FIGS. 6 and 9. A typical gin saw blade is fabricated from blue steel, has a diameter of about 12 inches, has a thickness of about 1/32 inch, and has a center hole provided with a single radially inward directed tang 2. The teeth of the blade are quite narrow and sharp, and are angled relative to the radii of the blade. Both FIGS. 6 and 9 show a partially formed blade.

The apparatus to be described is entirely automatic, operating on a stack of blade blanks 1 loaded into the magazine of the apparatus, and finishing with a stack of finished blades supported on a storage spindle. The apparatus is powered by a main electric drive motor, and several air cylinder motors operated from a suitable source of air pressure.

Referring particularly to FIGS. 1 and 2, the principal components of the apparatus include a base frame 4 supported on suitable legs 5, and a superposed spindle table 6 having a form of table top 7.

A collet chuck 10, for supporting and driving the blade blank 1 during the cutting operation, is disposed above the table top 7; and its associated drive mechanism is disposed within the spindle table 6. A cutter wheel 11, and its associated mechanism, is supported by the spindle table adjacent to the table top 7. A drive mechanism 12 for the cutter wheel, including power takeoff and other components, is supported on both the spindle table 6 and a base frame 4. A control valve bank 13 is mounted within the spindle table 6; and a cam shaft with valve operating cams is driven from the drive mechanism 12. An ejector yoke 14 is disposed above the table top 7, surrounding the collet chuck 10, to eject the finished blade and direct it to a storage spindle 15. A magazine and feed mechanism 16, for a supply of blade blanks 1, is supported on the base frame 4. A carrier mechanism 17 for transmitting blanks from the magazine 16 to the collet chuck 10 is supported on the spindle table 6.

The collet chuck 10, and its associated drive mechanism, are particularly illustrated in FIGS. 2, 3, 4, and 5. The collet chuck is carried at the top of a spindle 20 which is rotatably mounted in a subframe 21, and extends upwardly through the table top 7. The subframe 21 is mounted for limited pivotal movement relative to the spindle table 6, about a shaft 22 which also carries a worm drive for this mechanism. This pivotal movement is provided to enable the collet chuck, and the blank 1 carried thereby, to be fed laterally toward and away from the cutter wheel 11 as will be described subsequently. As best seen in FIG. 2 the spindle shaft 20 has nonrotatably mounted thereon a worm gear 23, in driving engagement with a worm carried on the worm shaft 22, and a flywheel 24. The collet chuck includes a yieldable drive coupling consisting of a driving arm 25 and a driven arm 26, the driven arm being integral with the collet chuck body 27, these arms extending radially from the spindle axis. The driving arm is nonrotatably fixed to the spindle; and the driven arm and associated chuck body are rotatably supported on the spindle by means of a bushing 28 and a thrust bearing 29. The spindle and chuck are driven clockwise, as viewed from the top of the apparatus, and the driving arm 25 is coupled to the driven arm by means of a pull rod 30 and compression spring 31. During drive, the driving arm 25 will separate intermittently from the driven arm 26, and bumpers 32 are provided between the arms to limit bounce as the arms return to the indicated position.

The chuck body 27 is a generally cylindrical sleeve member, having a radial flange 33 at the bottom and an adjacent conical spreader cam 34. The driven arm 26 is an integral extension of the flange 33. A support disk 35 is mounted on the upper surface of the flange 33 for supporting the saw blade blank 1. The chuck collet 36 is an inverted cup-shaped member supported on the upper end of the body 27 for vertical sliding movement and having a plurality of downwardly extending, radially separate, fingers which carry radially outwardly projecting lugs 37 at the distal ends. As best seen in FIG. 6 the diameter defined by the outer extremities of the lugs 37 corresponds to, and is slightly smaller than, the diameter of the center hole in the blade blank 1; and the spaces between the lugs 37 are configured to receive the tang 2 of the blank. The fingers have bevelled cam surfaces for coaction with the body cam 34.

When the blank is received on the chuck assembly, the lugs are caused to expand against the periphery of the blank center hole, to clamp the blank for rotation with the spindle 20. The lugs are provided with relative sharp outer ridges for biting into the blade material. This spreading of the collet fingers is accomplished by the axially downward movement of the collet 36 effected by a pull rod 38 and associated pressure cap 39 through a thrust bearing 40, the pull rod 38 extending through the hollow spindle 20. The downward movement of the pull rod 38 is effected by means of a diaphragm assembly 41 and associated return spring 42 (best seen in FIG. 2); the diaphragm assembly being controlled through an appropriate pneumatic valve.

The cutter wheel 11 is mounted on a horizontal drive shaft adjacent to the edge of the table 7, and includes a plurality of radially extending teeth-like cutter elements. The cutter elements are wedge-shaped in radial cross-section and configured to punch out the material between the adjacent teeth of the saw blade 1. As best seen in FIG. 9, the cutter teeth coact with a pair of dies 45 and 46 which are mounted in appropriate die holders 45a and 46a secured to the table 7. The dies 45 and 46 are elongated plate-like members, the ends of which coact with the cutting edges of the cutter blade teeth.

In order to lubricate the cutter wheel teeth, a lubricant tank 47 is supported on the spindle table 6 beneath the cutter wheel; and a lubricant wheel 48 is rotatably mounted within the tank 47 to carry lubricant from the tank to the cutter. The lubricant wheel is provided with radially outwardly extending fingers 49, which are bent at right angles to the wheel plane and are configured and spaced to be received between the teeth of the cutter blade. The lubricant wheel is rotated by the interengagement with the cutter wheel teeth; and the fingers 49 then deposit lubricant on the cutter wheel teeth.

Referring now to the relationship of the cutter wheel 11 and the saw blade blank 1, the saw blade is necessarily in interference relation with the cutter wheel during the cutting of the teeth. However, during the depositing of the blank onto the chuck 10, and the removal of the finished saw blade from the chuck, the blade must be moved out of this interference relation. This movement is permitted by the rotation of the entire chuck and spindle drive assembly about the shaft 22, and is effected by a shift mechanism best seen in FIGS 3 and 4. The spindle 20 is rotatably supported, as it passes through the table top 7, by means of a bushing block 51 carrying a sleeve bushing 52. The bushing block 51 is supported for lateral movement within a rectangular opening 53 in the table top 7, and is guided by bearing plates 54. Lateral movement of the bushing block within the table top opening is effected by a single acting air cylinder 55 and an actuator rod 56 pivotally connected to one end of the bearing block. The air cylinder 55 effects movement of the spindle and chuck toward the cutter wheel 11; and a return spring 57 effects the return movement. The limit of movement of the block and chuck toward the cutter wheel is controlled by a stop screw 58, threaded into a suitable bore in the table top 7 and secured in position by a suitable lock nut. As best seen in FIG. 1, a suitable lever 59 and associated latch are provided for manually shifting the spindle into the cutter interference position, for the purpose of servicing and adjusting the apparatus.

To assure that the blank 1 moves into proper relation with the cutter wheel 11, a pair of guides 60 are mounted in association with the table top 7. FIG. 10 illustrates in detail one such guide, mounted on the die holder 45a. This guide defines, with the die holder, a slot 60a into which the blank will be guided for proper relationship with the cutter dies 45 and 46. Should the edge of the blank be elevated relative to the desired position, it will engage a recess 60b of the guide to prevent engagement of the blank with the cutter wheel. These guides 60 then prevent destruction of the blank in the event that the blank is not clamped in the precise position on the collet chuck, or in the event a blank is warped for example.

Referring now to the overall drive mechanism 12 for the apparatus, a suitable electric motor 61 drives the main drive shaft enclosed in housing 62 by means of suitable belting enclosed in a shroud 63. The main drive shaft carries a flywheel 64 and a worm (not shown) within the housing 62, which worm drives an associated worm gear fixed to the cutter shaft 44 which also is a power takeoff shaft for other components.

Figure 17:
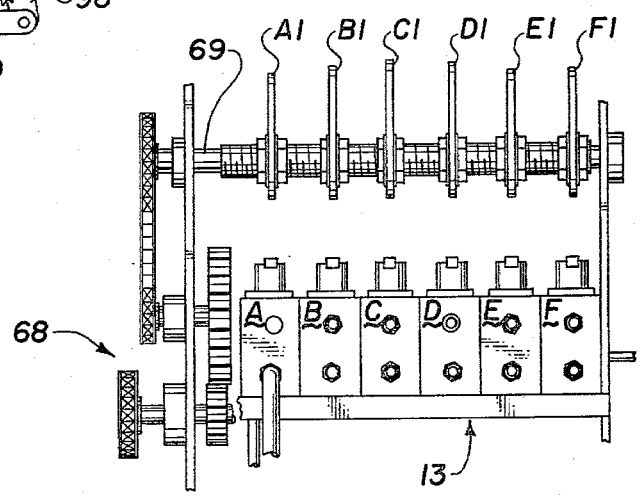
FIG. 17 is a fragmentary plan view of a bank of control valves and associated operator cams.

The spindle drive worm shaft 22 is driven from the output shaft 44 by means of chain sprockets 65 and 66 fixed to the respective shafts and an associated drive chain 67. Another chain sprocket fixed to the shaft 22 provides power takeoff for the drive mechanism 68 for the cam shaft 69 associated with the control valve bank 13. As best seen in FIG. 17, the drive mechanism 68 includes a combination of chain drives and gear drives to produce the desired rpm of the cam shaft 69 relative to the spindle 20, which relationship will be referred to subsequently. The control valve bank 13 consists of six pneumatic valves A, B, C, D, E and F which are controlled by respective adjustable cams A1, B1, C1, D1, E1, and F1 nonrotatably carried on the cam shaft 69. All of the functions of the machine are controlled by these pneumatic valves; and one operating cycle of the apparatus is produced by one revolution of the cam shaft and associated cams.

The ejector mechanism 14 for the finished blade 1, as best seen in FIGS. 1 and 11, consist of a form of yoke 71 which generally surrounds the chuck support plate 35, having a retainer lip 72, which is fixed to a shaft 73 pivotally supported at one edge of the table top 7. The shaft 73 is rotated by means of a crank arm 74 fixed to the shaft and operated by a single-acting air cylinder 75 mounted on the spindle frame. The yoke is rotated to the eject position illustrated in FIG. 11 by means of air pressure in the cylinder; and is returned to the rest position by means of a return spring 76. When the mechanism is rotated to the eject position in FIG. 11, the finished blade is retained by the lip 72, and the blade is flipped onto the storage spindle 15 which is received in the center hole of the blade. The storage spindle is mounted on an appropriate base secured in desired relation to the base frame 4 of the apparatus.

The magazine 16 for the supply and feeding of blade blanks to the apparatus includes a base 78 and supporting legs 79 joined to the base frame 4. Three equally spaced guide rods 80 extend upwardly from the periphery of the base 78, and guide a three-armed spider 81 having radial slots at the arm ends to receive the guide rods 80. The spider 81 is a support table for a stack of blade blanks 1; and its vertical movement is effected by means of a lift screw 82 nonrotatably fixed at its upper end to the spider 81. The lift screw is in threaded engagement with a nut element integral with a drive gear 83, rotatably mounted on the base 78. As best seen in FIG. 12 the drive gear 83 is rotated intermittently by means of a pawl 84 carried on an arm 85 pivotally mounted about the axis of the drive gear 83. The pawl is maintained in engagement with the teeth of the drive gear 83 by means of a suitable spring; and the arm 85 and associated pawl are rotated in a clockwise direction as viewed in FIG. 12 by means of a single acting air cylinder motor 86; and returned by means of a return spring 87. The air cylinder 86 will be actuated for each cycle of the machine; and the lead of the screw 82 and associated nut is such that for each cycle of the air cylinder the spider 81 and associated stack of blanks will be elevated a distance equivalent to one blade thickness. The top of the blade stack will then be maintained near the top of the magazine 16 for coaction with the carrier mechanism to be described.

An alternative form of magazine could include a pair of assemblies as above described rotatable alternatively into the desired operation position, so that while one such assembly is operative, the other assembly could be loaded with a new supply of blanks without significant interruption of the operation of the apparatus.

The carrier mechanism 17 includes a head 88 carried on the distal end of a horizontal arm 89; and the proximal end of the arm is fixed to the upper end of an actuator shaft 90 of an actuator mechanism 91, which provides for rotation and vertical reciprocation of the actuator shaft. The actuator mechanism includes an air cylinder motor 92 for effecting vertical movement of the shaft 90, and an air cylinder motor 93 for effecting rotation of the shaft 90. The actuator mechanism 91 is fixed to the spindle table 6, and positions the head 88 adjacent to the upper end of the magazine 16.

The basic cyclical movements of the head 88 are: (1) downward movement to the magazine to pick up a blank; (2) movement upward to the limiting position; (3) counterclockwise rotation to position the head over the collet chuck 10; (4) downward movement to position the blank for release onto the collet chuck; (5) movement to the upper limiting position; (6) clockwise rotation to position over the magazine 16. For picking up the blank, the head 88 includes three suction cups 94, mounted for vertical reciprocating movement relative to the head and biased to the lowermost position by compression springs 95. This mounting allows some limited movement of the suction cups, relative to the head, to accommodate some variation in the height of the stack of blanks. The suction cups consist of flat cup-shaped disk members carried on hollow stems, with the disk members carrying a resilient peripheral ring 96 for sealing against the surfaces of the blanks. The hollow stems are connected with appropriate conduits 96 communicating with a source of vacuum.

Figure 15:
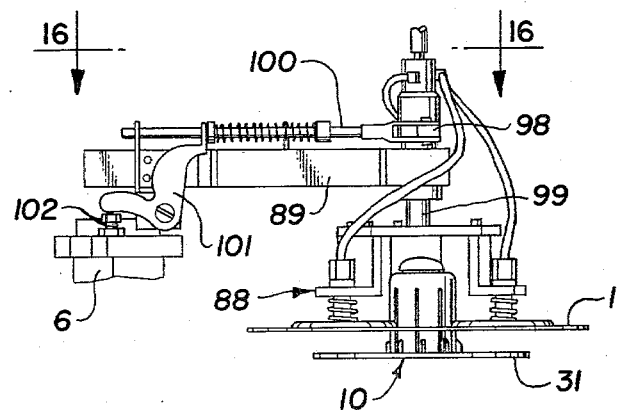
FIG. 15 is a fragmentary elevation view of the blank carrier and associated mechanism.
Figure 16:
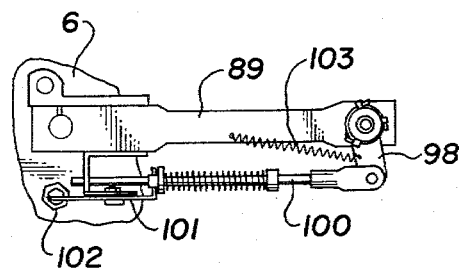
FIG. 16 is a fragmentary plan view of the blank carrier mechanism.

Another function of the carrier mechanism is to effect a slight rotational kick of the head 88 relative to the arm 89 at the moment the blank is released from the head. The mechanism for accomplishing this, as best seen in FIGS. 15 and 16, includes an arm 98 fixed to the head support shaft 99, which shaft 99 is rotatably supported in the arm 89. A push rod 100 is mounted for reciprocating movement, and has one end pivotally attached to the arm 98. A bell crank 101, pivotally mounted on the carrier arm, bears on a collar mounted on the push rod 100. When the carrier head is lowered to the blank discharge position, illustrated in FIG. 15, the bell crank 101 engages an adjustable stop 102 to effect rotation of the bell crank and corresponding kick rotation of the head 88 in a counterclockwise direction as viewed from the top of the apparatus. The kick rotation is timed just prior to the release of the blank by breaking the vacuum; and the blank is positioned about one-half inch above the support disk 35, for example, at the time of release. This kick rotation assures that the tang 2 of the blank will not hang up on one of the lugs 37 of the collet chuck clamp 36; and that the blank 1 will be correctly seated on the support disk 35 prior to being clamped by the collet chuck. When the carrier head is raised from the spindle, the head is rotated back to its normal condition by return spring 103.

Alternative Blade Discharge

Figures 18, 18A:
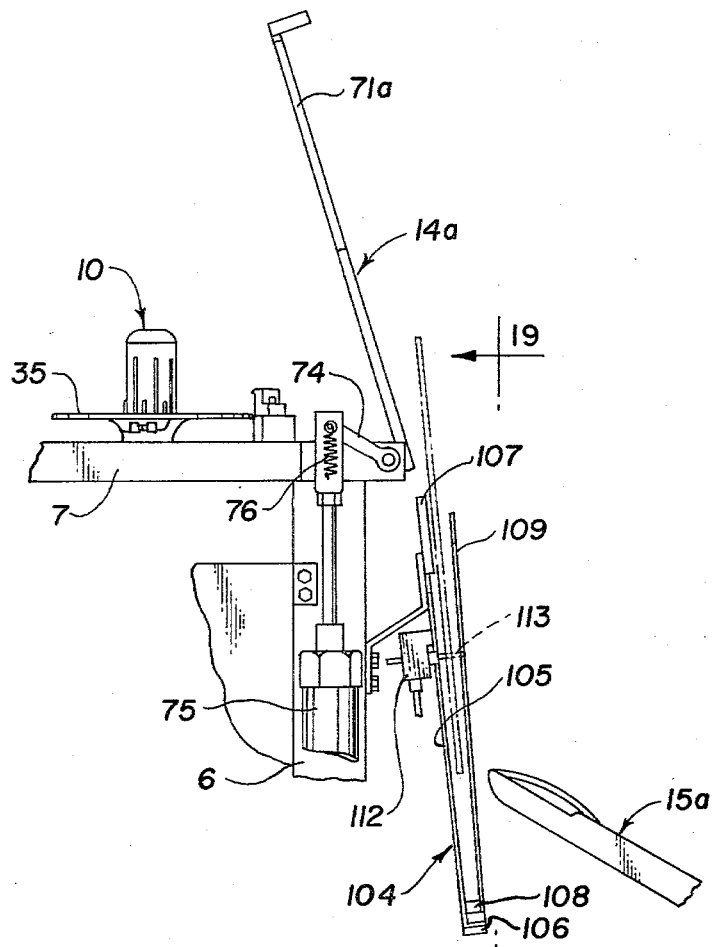
FIGS. 18 and 18a are fragmentary elevation views of an alternative form of blade discharge mechanism and related storage spindle.
Figure 19:
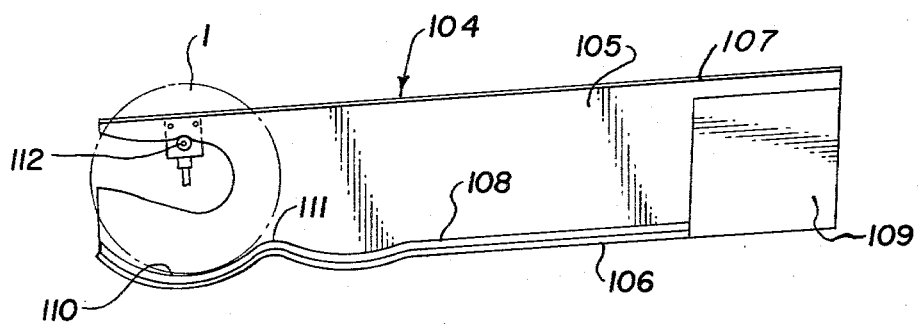
FIG. 19 is a detail elevation view, taken along the line 19—19 of FIG. 18, of the discharge chute for the blade discharge mechanism.

FIGS. 18 and 19 illustrate an alternative form of blade ejector mechanism and blade discharge mechanism. The alternative form of ejector mechanism 14a is identical to that previously described except for the elimination of the lip 72. This mechanism includes the same yoke 71 secured to a shaft 73 which is rotated by the air cylinder 75 and spring 76 through the crank arm 74 fixed to the shaft. Through elimination of the lip 72, when the yoke is raised to the ejector discharge position illustrated in FIG. 18, the blade slides off the yoke 71 into a receiving chute 104. The chute is secured to the spindle table 6 by means of suitable brackets, and is an elongated member inclined downwardly (5 degrees, for example) from the blade receiving position adjacent to the ejector yoke. As illustrated, the chute is generally in the form of a very shallow channel providing a side wall 105, a lower lip 106 providing support for the rolling blade 1, and an upper lip 107 which holds the rolling blade away from the wall 105 to minimize rolling friction. The chute is also inclined outwardly from top to bottom, as best seen in FIG. 18, so that the blade rolling along the lower lip 106 will lean by gravity against the upper lip 107. The entire lower lip 106 is lined with a resilient cushion 108 of rubber, for example, to prevent damage to the blade teeth. An outer guide plate 109 is secured to the chute at the receiving end, to guide the blade 1 into the chute as it is discharged from the ejector yoke 71a. Adjacent to the discharge end of the chute, the lower lip defines an arcuate pocket 110 for stopping the movement of the blade 1 in position to be discharged from the chute. Immediately ahead of the pocket 110 a retarding hump 111 is provided in the lower lip. An air cylinder 112 mounted on the chute at the discharge end includes a plunger 113 which serves to flip the blade 1 off the chute and onto the storage spindle 15a which is received in the center hole of the blade 1. The storage spindle 15a, seen in FIG. 18a, is mounted on a suitable base in desired relation to the base frame 4 of the apparatus.

Operation

An operating cycle of the apparatus will now be described beginning with the pickup of a blade blank 1 from the magazine 16.

When the apparatus is turned on, the drive motor drives the cutter wheel 11, the spindle shaft 20, and the valve cam shaft 69 at uniform speeds. An operating cycle is determined by one revolution of the cam shaft 69; and the spindle shaft 20 must rotate slightly more than one revolution between the operations which shift the spindle into and out of engagement with the cutter, to assure that the full complement of teeth will be cut. The cutter wheel speed must also be related to the spindle speed to assure the correct spacing of the saw blade teeth.

To initiate the cycle, the air cylinder 92 is actuated to lower the carrier head 88; and vacuum may be applied to the suction cups 94 simultaneously to effect pickup of the top blade 1 from the magazine 16. The cylinder 92 is actuated again to immediately raise the head to the uppermost position. The cylinder 93 then rotates the carrier mechanism counterclockwise to position the head over the collet chuck; and cylinder 92 is again operated to lower the head over the chuck. When the head approaches the lowermost position, the bell crank 101 engages the stop 102 to effect kick rotation of the head; and almost simultaneously the vacuum is released to release the blade 1 from the head. The blade then drops onto the support disk 35, with its tang 2 being received between the dogs 37 of the chuck clamp.

The diaphragm assembly 41 is next pressurized to pull down on the collet chuck clamp 36, and effect spreading of the associated fingers to securely clamp the blank 1 to the chuck. The chuck is then rotating with the spindle; and the air cylinder 55 is pressurized to shift the spindle laterally toward the cutter wheel 11. The rotation of the blade and chuck is intermittently stopped with the passing of each cutter blade tooth, and this is accommodated by the yieldable drive mechanism 25, 26. The flywheel 24 smoothes out the drive of the spindle shaft 20; and the bumpers 32 minimize the backlash when the follower arm 26 catches up to the leading arm 25 by means of the spring 31.

During the cutting operation, the air cylinder 92 is again operated to raise the carrier head and the cylinder 93 is then actuated to rotate the head clockwise back to its position over the magazine 16. At an appropriate time, possibly during the cutting operation, the magazine air cylinder 86 is pressurized to rotate the drive gear 83 and elevate the support spider 81 the equivalent of one blade thickness.

At the completion of the cutting operation, pressure is released from the cylinder 55 allowing the spring 57 to return the spindle assembly to the load-unload position. The diaphragm assembly 41 is depressurized allowing the chuck to release the finished blade.

The air cylinder 75 is next pressurized to raise the ejector yoke 71 and flip the finished blade 1 from the chuck 10 to the storage spindle 15. The yoke is immediately returned to the rest position by the return spring 76.

In order to save machine time, the operation of picking up the blade blank from the magazine may be performed simultaneously with the functioning of the ejector mechanism 14 so that the blank may be positioned on the spindle chuck immediately following the return of the ejector yoke to the rest position.

For the operation of the alternative form of ejector mechanism and discharge chute, the air cylinder 112 must be pressurized to effect the flipping of the blade 1 from the chute onto the storage spindle 15a. This function could be performed simultaneously, for example, with the operation of the ejector mechanism; 14a; that is the yoke 71a might be raised simultaneously with the projection of the plunger 113 to discharge one blade from the chute while the following blade is being dropped into the chute.

What has been described is a novel and unique form of apparatus for the fully automatic fabrication of circular saw blades from a blade blank. A general feature of the apparatus is the rapidity and efficiency with which such blades are fabricated.

An important feature of the apparatus is the precise timing of the functions, by means of pneumatic actuators and cam operated control valves for the actuators controlled by rotary cams fixed to a cam shaft. The cams are adjustable so that timing can be adjusted for precision and efficiency. A related feature and advantage of the invention is the timing precision accomplished by the driving mechanism which drives the chuck spindle, the cutter wheel, and the valve operator cam shaft at continuous speeds in precisely timed relation.

Another important feature of the invention is the improved yieldable drive coupling between the spindle and the chuck body, providing for rapid advance of the blade following the cutting of each tooth, and resistance to bounce of the coupling so that the teeth of the blade are precisely and uniformly cut on the blade periphery.

A further feature of the apparatus is the pneumatically controlled collet chuck which provides for secure clamping of the blade by the collet to obviate any blade slippage and resultant misalignment of the blade teeth.

A related feature is the carrier mechanism which provides a kick rotation of the blade almost simultaneously with the releasing of the blade to the chuck support, to assure that the blade tang will not hang up on one of the collet lugs resulting in mispositioning of the blade on the chuck.

A further feature of the apparatus is the pneumatic mechanism for feeding the chuck and blade to the tooth cutting position relative to the cutter wheel, and the associated guides for assuring that the blade blank will not move into cutting relation if it is not properly aligned with the cutting dies. This prevents waste of blade blanks, and possible damage to the cutter wheel and dies.

While the preferred embodiment of the invention has been illustrated and described, it will be understood by those skilled in the art that changes and modifications may be resorted to without departing from the spirit and scope of the invention.

What is claimed is:

1. Apparatus for forming teeth on a circular saw blade comprising
   a frame;
   a vertical drive spindle rotatably supported in said frame; a collet chuck mounted at the upper end of said spindle for supporting and clamping a saw blade in a generally horizontal plane;
   a rotary cutter, having peripherally spaced radially projecting teeth, mounted for rotation about an axis disposed in the plane of a supported saw blade; said cutter coacting with dies disposed in the plane of the blade to cut the blade teeth;
   said chuck being mounted for lateral feed, transversely of its axis of rotation, into and out of cutting relation with said rotary cutter;
   a pneumatic actuator for actuating said chuck to clamp and release a blade; a pneumatic actuator for feeding said chuck;
   a plurality of cam operated pneumatic valves for controlling said pneumatic actuators; a plurality of cams nonrotatably mounted on a cam shaft for controlling said pneumatic valves; and drive means for driving said spindle, said rotary cutter, and said cam shaft at selected speeds relative to each other.

2. Apparatus as set forth in claim 1
   means for driving said spindle and said rotary cutter at constant speeds;
   a yieldable rotary drive coupling connected between said spindle and said chuck, permitting said chuck and a blade clamped thereto to rotate intermittently to enable the cutting of successive blade teeth by said rotary cutter.

3. Apparatus as set forth in claim 1
   an ejector member mounted for movement relative to said frame, normally disposed beneath the plane of a blade supported on said chuck; a pneumatic actuator for moving said ejector member between said normal position and a blade discharge position; and a cam operated pneumatic valve for controlling said actuator.

4. Apparatus as set forth in claim 3
   a magazine mounted in fixed relation to said frame, including a vertically movable support table for a vertical stack of saw blade blanks; means including a pneumatic actuator for elevating said table intermittently; and a cam operated pneumatic valve for controlling said actuator;
   a carrier including a carrier frame mounted on said frame for vertical and rotary swinging movement; a pneumatic actuator for reciprocating said carrier frame vertically; a pneumatic actuator for rotation said carrier frame; and cam operated pneumatic valves for controlling, respectively, said reciprocating and said rotating actuators.

5. Apparatus as set forth in claim 2
   said yieldable rotary drive coupling comprising a first radial arm fixed to said spindle, a second radial arm fixed to said chuck, and spring means coupling said arms for limited relative rotation.

6. Apparatus as set forth in claim 2
   said yieldable drive coupling comprising
   a first radially extending arm nonrotatably fixed to said spindle; a second radially extending arm nonrotatably fixed to said collet chuck; anti-backlash bumpers fixed to said arms adjacent to the distal ends thereof for engagement with each other; spring means urging said arm bumpers into abutting relation.

7. Apparatus as set forth in claim 1
   said collet chuck comprising a body rotatably mounted on said spindle; said chuck body having means providing a support plane for a saw blade; rotary and thrust bearing means supporting said body on said spindle;
   said collet chuck further comprising an inverted cup-shaped collet having downwardly projecting fingers extending to said support plane; said fingers having cam surfaces coacting with a conical cam surface of said chuck body, to effect radial expansion of said fingers;
   and said chuck actuator means comprising a pull rod extending through said chuck and said spindle, a pressure cap fixed to the upper end of said pull rod, and thrust bearing means disposed between said pressure cap and said collet whereby downward pull on said pull rod effects expansion of said collet fingers;
   said clamping pneumatic actuator comprising piston means effective to pull said pull rod downward relative to said spindle.

8. Apparatus as set forth in claim 7
   a yieldable rotary drive coupling comprising a first radially extending arm fixed to said spindle, a second radially extending arm fixed to said chuck body, and spring means coupling said arms for limited relative rotation.

9. Apparatus as set forth in claim 7
   said collet fingers each carrying a radially outward projecting lug at the distal end thereof and disposed in said support plane; each lug having a relatively sharp distal ridge for biting engagement with the periphery of a saw blade center hole.

10. Apparatus as set forth in claim 3
    said ejector member comprising a yoke, pivotally mounted on said frame adjacent to said chuck and generally enclosing said chuck, and a transverse lip adjacent to the pivot axis thereof for supporting said blade in the plane of said yoke; and storage spindle means disposed relative to said frame to be received in the center hole of a blade swung upward from said chuck by said ejector member.

11. Apparatus as set forth in claim 3 an inclined chute mounted on said frame with its upper end adjacent to said chuck;

said ejector member comprising a yoke pivotally mounted on said frame and generally enclosing said chuck; said yoke being effective to swing said blade to a generally vertical plane to be discharged into said chute;

storage spindle means mounted relative to said frame, and disposed adjacent to the lower discharge end of said chute to be received in the center hole of said blade; and a pneumatically actuated plunger means for pushing said blade from said chute onto said storage spindle.

12. Apparatus as set forth in claim 4 said carrier including a carrier head comprising downwardly directed peripherally spaced suction cups; vacuum means connected to said suction cups; and a cam operated valve for controlling said vacuum means.

13. Apparatus as set forth in claim 12 said carrier head being rotatably mounted on said carrier frame about a vertical axis; lever means mounted on said carrier frame for imparting a kick rotation to said carrier head; and an adjustable actuator trip mounted on said apparatus frame, engageable by said lever means when said carrier is lowered over said chuck, to effect said kick rotation of said carrier head and the saw blade about to be released therefrom.

14. Apparatus as set forth in claim 1 guide means mounted on said frame for guiding the feeding of a blade carried on said chuck into cutting relation with said rotary cutter and dies; said guide means preventing movement of a misaligned blade into said cutting relation.

* * * * *